United States Patent [19]

Paddock et al.

[11] Patent Number: 4,585,126
[45] Date of Patent: Apr. 29, 1986

[54] METHOD AND APPARATUS FOR HIGH SPEED PROCESSING OF FRUIT OR THE LIKE

[75] Inventors: Paul F. Paddock, Riverside; Everett G. LaVars, Pomona, both of Calif.

[73] Assignee: Sunkist Growers, Inc., Sherman Oaks, Calif.

[21] Appl. No.: 546,274

[22] Filed: Oct. 28, 1983

[51] Int. Cl.⁴ .................. B07C 5/02; B07C 5/342
[52] U.S. Cl. ........................ 209/539; 193/8 R; 198/452; 198/706; 198/803.14; 209/587; 209/698; 209/911; 209/912; 209/914; 209/917
[58] Field of Search ............... 209/539, 563–566, 209/587, 698, 911, 912, 914, 917, 923; 193/2 R; 198/448, 452, 655, 698, 706, 802, 565, 576, 803.14

[56] References Cited

U.S. PATENT DOCUMENTS

| | | | |
|---|---|---|---|
| 466,043 | 12/1891 | Hunt | 198/706 |
| 1,706,734 | 3/1929 | Hughes | 209/912 X |
| 2,232,210 | 2/1941 | Carroll | 209/912 X |
| 2,312,051 | 3/1943 | Cutler | 209/914 X |
| 3,206,022 | 9/1965 | Roberts, Jr. et al. | 209/912 X |
| 3,768,645 | 10/1973 | Conway et al. | 209/912 X |
| 3,930,995 | 1/1976 | Paddock et al. | 209/698 |
| 4,106,628 | 8/1978 | Warkentin et al. | 209/698 X |
| 4,254,877 | 3/1981 | Rose | 209/912 X |
| 4,489,822 | 12/1984 | Hiebert | 198/576 X |

FOREIGN PATENT DOCUMENTS

2412481  8/1979  France ................ 209/914

Primary Examiner—Robert B. Reeves
Assistant Examiner—Edward M. Wacyra
Attorney, Agent, or Firm—Paul A. Weilein

[57] ABSTRACT

A method and apparatus are disclosed for high-speed processing of fruit or the like wherein the fruit is initially accumulated and aligned at a pick-up point for capture in spaced-apart pockets of a singulation conveyor at the pick-up point to maintain the fruit in predetermined linear spacing and to accelerate the fruit to a predetermined processing speed, a processing conveyor being operated at a synchronized speed relative to the singulation conveyor for receiving the individual units of fruit, the fruit being carried in trays past a sensor station after which the fruit is discharged from the trays into one of a plurality of discharge passages according to the individual characteristics of the fruit units. A preferred construction for accumulating and aligning the fruit at the pick-up point comprises multiple interconnecting ramps of different inclinations to further assure a continuous supply of fruit at the pick-up point. The singulation conveyor preferably includes an endless belt having spaced-apart pockets for receiving individual units of fruit and being adapted for passing the pick-up point along an upward incline, each of the pockets being adapted for capturing a first unit of fruit and rejecting subsequent units of fruit, the fruit being projected from the pockets along a short arc for reception by respective trays of the processing conveyor. The trays in the processing conveyor preferably provide three-point support for the fruit to assure proper exposure of random-sized fruit to an optical sensor. Furthermore, the trays are also adapted to facilitate interchangeable connection with the processing conveyor and to facilitate discharge of the fruit into one of the plurality of discharge passages.

33 Claims, 21 Drawing Figures

METHOD AND APPARATUS FOR HIGH SPEED PROCESSING OF FRUIT OR THE LIKE

BACKGROUND OF THE INVENTION

The present invention is directed toward a method and apparatus for high-speed processing of fruit or the like and more particularly to such a method and apparatus wherein individual characteristics of individual units are sensed so that the units are sorted according to their individual characteristics.

A variety of techniques and apparatus have been disclosed in the prior art for automatically grading and sorting fresh fruit and the like according to size, surface blemishes, surface color and even internal characteristics of the fruit. In the latter case, X-ray detectors have been employed, for example, for automatically evaluating articles, particularly citrus fruit, on the basis of relative uniformity of transparency to X-rays for separating the fruit or other article into different grades according to such evaluation. Although the present invention is particularly concerned with such a method and apparatus adapted for the grading and sorting of fresh fruit and the like, such methods and apparatus may be adapted to sorting a variety of articles. Accordingly, the scope of the present invention is not strictly limited to the grading and sorting of fruit.

As the state of the art in the grading and sorting of fruit and the like has developed beyond manual sorting techniques, it has become particularly important to develop reliable methods and apparatus which are capable of accurately grading and sorting fruit at relatively high speeds. Once again, it is important that these operating characteristics be achieved regardless of whether the fruit or other article is being graded and sorted depending upon size, surface color, surface blemishes or even internal characteristics of the fruit or other article.

In connection with one particular aspect of the present invention, there has been found to remain a need for an improved method and apparatus for automatically grading and sorting articles such as fruit according to size where the fruit is initially available in random sizes. Manual sorting of fruit according to size was initially replaced by mechanical sizers. However, such mechanical sizers have been found to be somewhat inaccurate primarily because of irregular shapes exhibited by various units of fruit. Accordingly, improved techniques for sizing fruit and the like have been developed in the prior art. One such prior art development by the assignee of the present invention involved optical sensing of size characteristics of the fruit in a manner permitting much more accurate determination of the volume of the fruit regardless of its particular shape. This optical technique, although not a feature of the present invention by itself, is hereinafter referred to in order to permit a more complete understanding of the invention.

At the same time, either in connection with optical sizing of fruit as referred to above or in sorting the fruit and the like according to other characteristics, there has also been found to remain a need for improved machinery and methods of operation in order to achieve high speeds of operation necessary for efficiency while still maintaining accuracy.

In such high speed operations, it is initially important to assure that one and only one individual unit of fruit or the like is loaded into each receiving point on a conveyor for passage through the detector station. In achieving this object, it has been found that, in some methods and apparatus for processing fruit or the like, particularly where random sizes are involved, more than one unit may become lodged in a single receiving point on the processing conveyor. This is, of course, unacceptable since the detector is generally not capable of determining whether it is scanning one or more articles.

In addition to the problem of singulation as summarized above, it has also been found to be difficult to properly locate each individual unit of fruit or the like in a conveyor during passage through a suitable detector or the like. A similar problem has been found to exist in assuring proper exposure of each article to the detecting station, particularly when the detector employs optical means which must necessarily scan a substantial surface portion of the article.

Finally, it has also been found desirable to develop improved techniques for discharging individual units of fruit or the like into respective discharge passages according to their individual characteristics while assuring relatively gentle handling of the articles during the entire processing in order to prevent further damage.

In any event, there has been found to remain a need for an improved method and apparatus for achieving the high speed sorting or grading of articles such as fruit, particularly where the fruit or other article is initially supplied in random sizes.

SUMMARY OF THE INVENTION

Accordingly, it is an object of the invention to provide an improved method and apparatus for achieving high speed sorting of fruit or the like.

More particularly, it is an object of the invention to provide such an improved method and apparatus wherein the fruit or other articles are initially available in random sizes. With the articles being initially available in random sizes, the method and apparatus may preferably be adapted to grade according to size. However, even with an initial supply of random size articles, the method and apparatus may be carried out on another basis such as surface color, surface blemish, internal characteristics or the like.

It is a further object of the invention to provide an improved method and apparatus for high speed processing of fruit or the like wherein the fruit is initially accumulated and aligned to provide a continuous supply of fruit at a pick-up point, a singulation conveyor being operated for movement past the pick-up point to receive individual units of fruit in predetermined linearly spaced-apart pockets and accelerating the fruit to a predetermined processing speed, a processing conveyor being synchronized for operation with the singulation conveyor to receive the individual units of fruit in an endless array of trays from which they are discharged according to individual characteristics of the fruit units. It is particularly contemplated that the fruit is initially supplied in random sizes, the spaced-apart pockets including means for accepting a first unit of the random sized fruit and rejecting any successive unit of fruit.

It is a related object of the invention to provide alignment apparatus either individually or within the method and apparatus referred to above for accumulating and aligning a continuous supply of fruit or the like at a pick-up point including a first ramp being inclined downwardly from a source of fruit or the like toward the pick-up point, an individual ramp being arranged for receiving the fruit from the source and being inclined downwardly for interconnection with the first ramp at a point upstream of the pick-up point for further assuring a continuous alignment of fruit in the first ramp adjacent the pick-up point.

It is also a related object of the invention to provide a singulation conveyor either alone or within the method and apparatus referred to above, the singulation conveyor including a continuous conveyor means with an endless array of spaced-apart pockets for receiving individual units of fruit or the like, each of the pockets being formed with an upstanding end-wall for engaging an individual unit of fruit while passing a pick-up point providing an aligned supply of fruit or the like, each pocket having inwardly inclined surface means forward of the end-wall for capturing a first unit of fruit engaged by the end-wall and outwardly inclined surface means forward of the inwardly inclined surface means and adjacent the upstanding end-wall of a preceding pocket for causing additional units of fruit to be rejected from the continuous conveyor means. The singulation conveyor is also preferably adapted for projecting the units of fruit from the individual pockets along a short trajectory at a transfer point to suitable processing means.

It is yet another related object of the invention to provide a processing conveyor either independently or within the method and apparatus referred to above, the processing conveyor being formed with an endless array of rotatably supported trays for receiving individual units of fruit at a transfer point, each of the trays being formed with a laterally extending projection riding in a track parallel to the array of trays at least adjacent a discharge station, sensor means being operable for detecting individual characteristics of the units of fruit and thereupon causing an interruption in the track so that a respective tray is rotated into an unloading position for discharge of its fruit into a selected one of a plurality of discharge passages.

It is yet another related object of the invention to provide a processing conveyor generally of the type referred to above either independently or within the method and apparatus referred to above. Therein, each of an endless array of trays for carrying fruit past an optical sensor is formed with a floor having a central opening with three triangulated surfaces forming a three-point support for each unit of fruit in order to better assure rapid positioning in a centralized location, thus providing proper exposure of the units of fruit to the optical sensor.

Additional objects and advantages of the invention are made apparent in the following description having reference to the accompanying drawings.

BRIEF DESCRIPTION OF THE DRAWINGS

FIGS. 1A and 1B being taken together, with FIG. 1A on the left and FIG. 1B on the right, to illustrate the entire system.

Similarly.

DESCRIPTION OF THE PREFERRED EMBODIMENT

High-speed processing apparatus of the type contemplated by the present invention is generally indicated at 20 in FIGS. 1A, 1B and 2A, 2B. As noted above, the invention preferably contemplates high-speed sorting of fruit such as oranges. However, it will be apparent that the high-speed processing apparatus 20 as well as the method disclosed in conjunction therewith may also be employed for the processing of other items in addition to fruit. In describing the high-speed processing apparatus 20, its general components are first summarized with respect to FIGS. 1A, 1B and 2A, 2B, followed by a more detailed description of various components of the apparatus having additional reference to the other FIGURES.

Figure 1A:
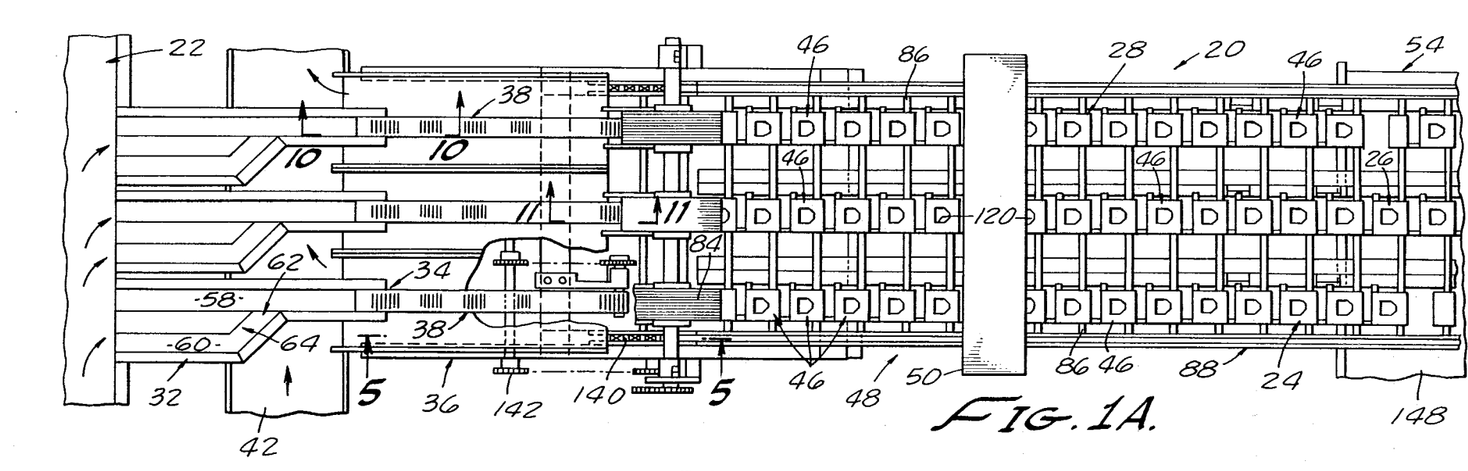
FIG. 1A is a plan view of one end of a high-speed sorting or processing system according to the present invention.
Figure 1B:
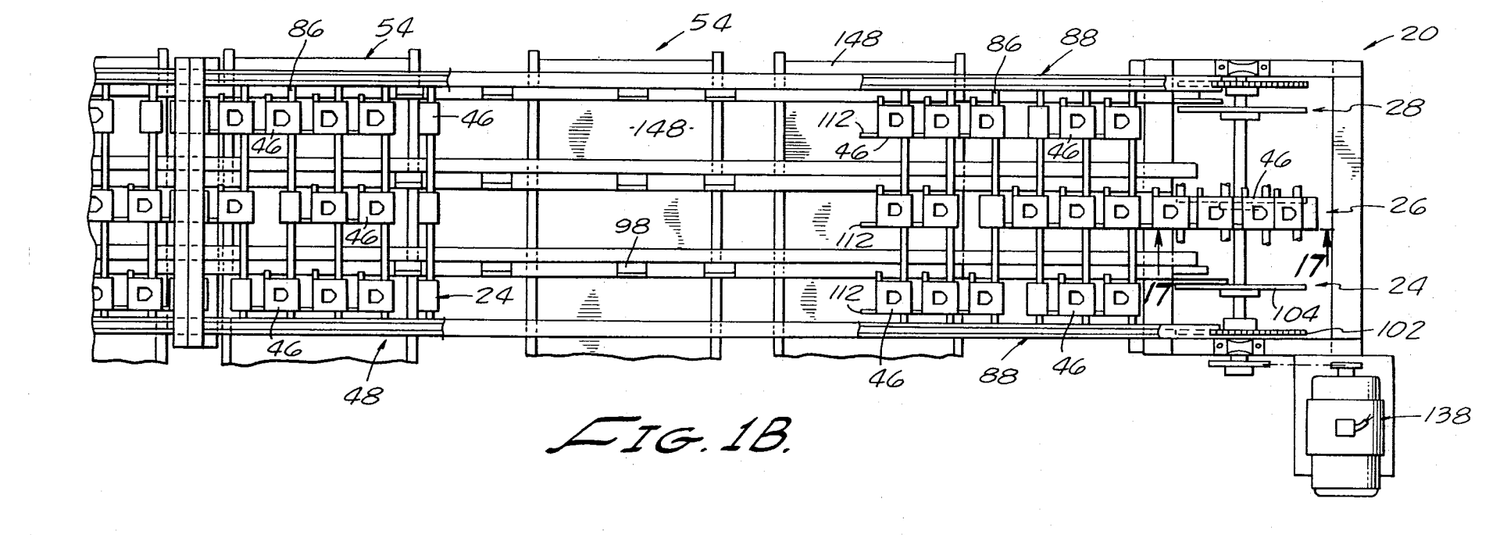
FIG. 1B is a similar plan view of the other end of the high-speed sorting or processing system.

Fruit or other like items, preferably of random-sized distribution, are initially supplied to the processing apparatus 20 from a source 22 which may be a simple apron or conveyor, for example. Fruit from the source 22 is then uniformly distributed into parallel processing paths as generally indicated in FIGS. 1A and 1B at 24, 26 and 28. Since the details of construction and operation are essentially identical for each of the parallel processing paths, only the components in the processing path 24 are described in detail below, it being understood that the description also applies to the parallel paths 26 and 28. It is further to be noted in FIGS. 1A and 1B that certain section lines for the other FIGURES. are applied to the parallel paths 26 and 28. However, these section lines are located merely for convenience and it is to be understood that those additional views also apply to the processing path 24 hereinafter described.

Initially, random-sized fruit or the like, generally indicated at 30, is supplied to an alignment or queuing assembly 32 adapted for assuring a continuous aligned supply of fruit at a pick-up point 34.

A singulation conveyor 36 is arranged for continuous movement past the pick-up point. The singulation conveyor 36 includes an endless conveyor belt means 38 formed with individual pockets 40 (see FIGS. 5-9) which are spaced apart for receiving individual units of fruit at a pick-up point. The singulation conveyor 36 forms a linearly spaced-apart arrangement of fruit in the pockets 40 which are further adapted to reject any additional units of fruit and to accelerate the fruit to a predetermined processing speed.

Subsequent units of fruit which are rejected by any of the pockets in the singulation conveyor 36 are returned to a reject conveyor 42 from which the fruit may be returned, for example, to the source 22 or for further processing.

The other end of the singulation conveyor 36 opposite the pick-up point 34 forms a transfer point 44 at which fruit from the individual pockets 40 on the endless conveyor belt 38 are transferred into respective trays 46 formed in an endless array upon a sorting or processing conveyor 48. The speed of the processing conveyor 48 is synchronized to move at substantially the same rate of speed as the singulation conveyor 36 so that successive units of fruit from successive pockets 40 in the singulation conveyor are received by successive trays 46 in the processing conveyor 48. Accordingly, the combination of the singulation conveyor and the processing conveyor substantially assures that one and only one unit of fruit is present in each of the trays 46 for optimum processing efficiency.

Once the units of fruit are in place upon the trays 46 of the processing conveyor 48, they are conveyed past a sensor or detector station 50 which preferably includes optical sensor means 52 for determining individual characteristics of each unit of fruit. As noted above, the optical sensor means 52 is preferably adapted for determining the size of each individual unit of fruit so that the fruit may be separated according to size. In that respect, once the fruit passes the detector station 50, it is carried to a discharge station 54 which functions in response to the detector station 50 for discharging the individual units of fruit into one of a plurality of discharge passages 56 depending upon individual characteristics such as size for the respective units of fruit.

In operation, the individual trays 46 of the processing conveyor 48 are adapted to normally be maintained in a horizontal fruit supporting position. However, as will be described in greater detail below, the discharge station 54 includes means or pivoting the individual trays at a precisely predetermined location so that the individual unit of fruit carried by each tray is discharged into one of the passages 56 according to its size characteristics as determined by the sensor means 52.

It is also noted that the optical sensor means 52 is not in itself disclosed as a novel feature within the present invention. However, it is briefly described in order to permit a more complete understanding of the present high-speed method and apparatus for processing or sorting fruit. Also, the function and location of the optical sensor means 52 is important in understanding one feature of the trays 46 in the processing conveyor 48 as will also hereinafter be discussed in greater detail.

Thus, the various components of the high-speed processing apparatus 20 as summarized above are believed to novelly permit high-speed processing or sorting of fruit or the like, particularly random-sized articles, with a high degree of accuracy and efficiency. Further details for the various components in the high-speed processing apparatus 20 are hereinafter described in greater detail.

Figures 2A, 3:
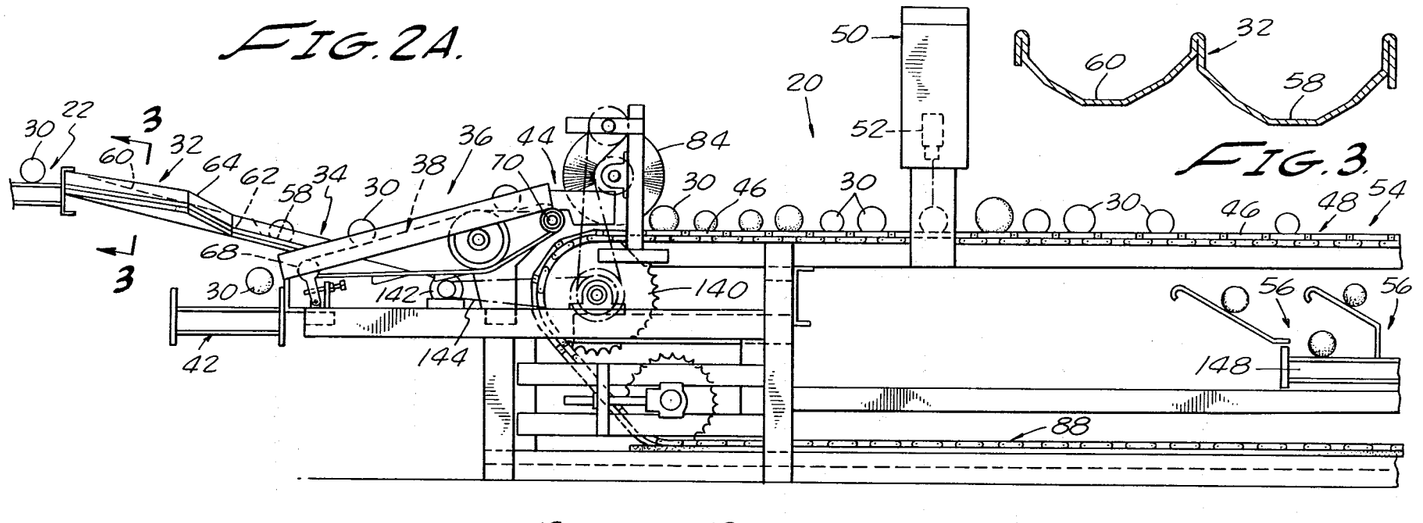
FIG. 2A is a side view in elevation of the one end of the processing system corresponding to that seen in FIG. 1A.
FIG. 3 is a view taken along section line 3—3 of FIG. 2A.
Figure 2B:
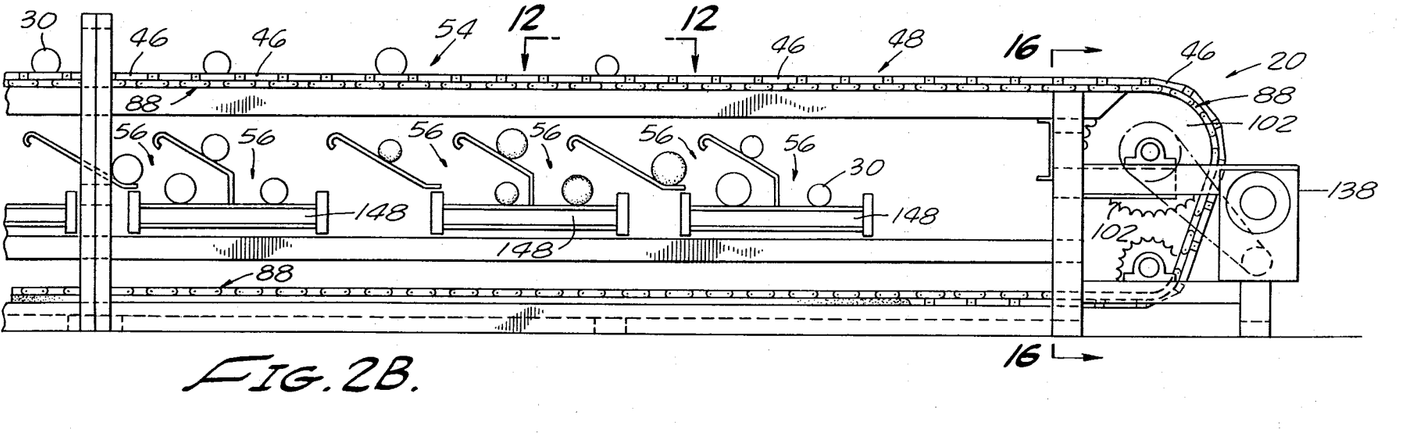
FIG. 2B is a side view in elevation of the other end of the processing system corresponding to FIG. 1B.
Figures 4, 5:
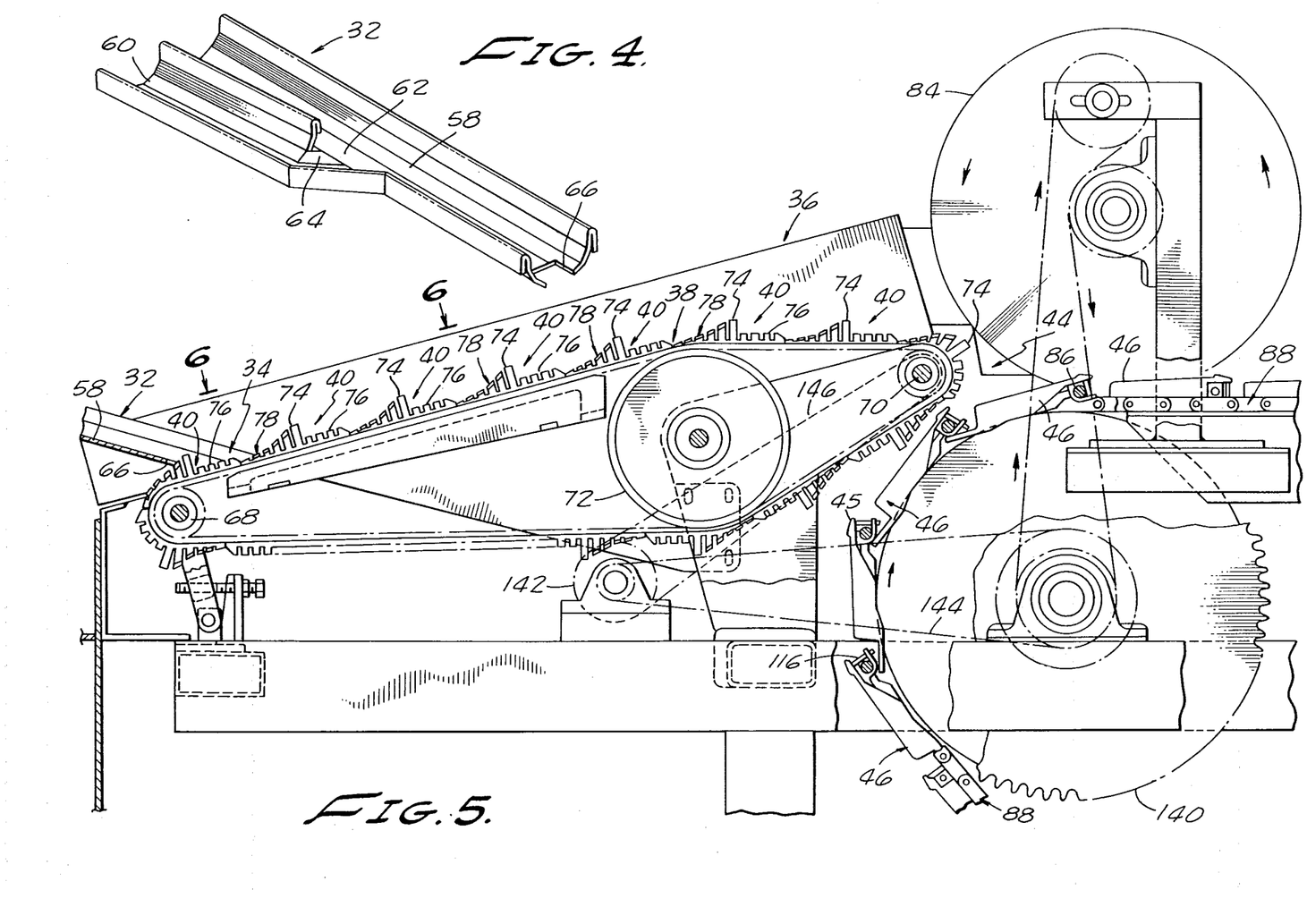
FIG. 4 is a perspective view of one of a plurality of ramp assemblies also shown in FIGS. 1A, 2A and 3.
FIG. 5 is an enlarged fragmentary view of a singulation conveyor forming a portion of the high-speed processing system.
Figure 6:
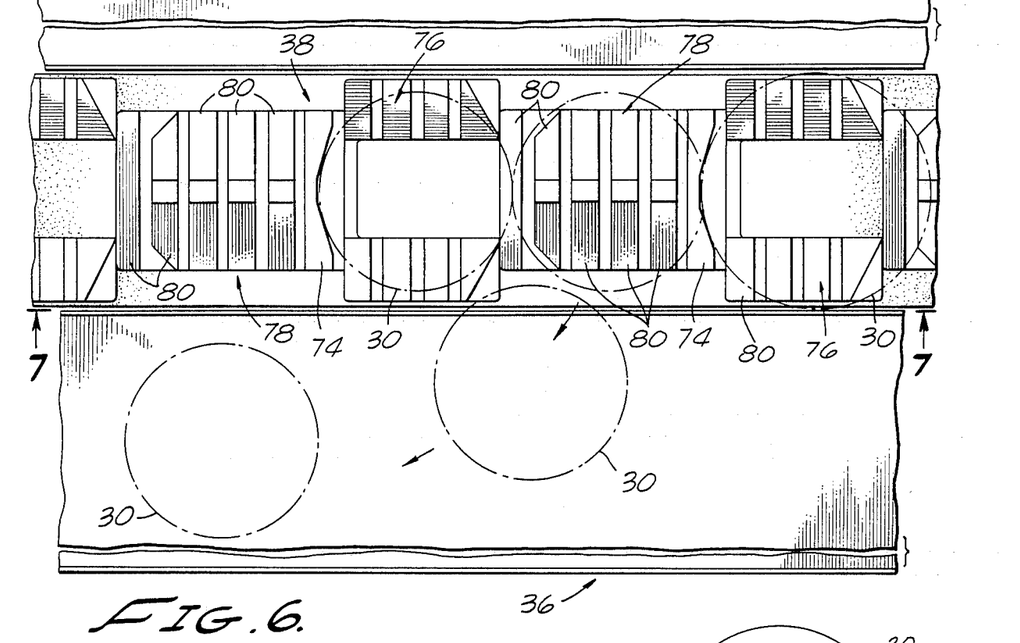
FIG. 6 is an enlarged fragmentary view taken along section line 6—6 in FIG. 5 to better illustrate detailed construction of the endless singulation conveyor.
Figures 7, 8, 9:
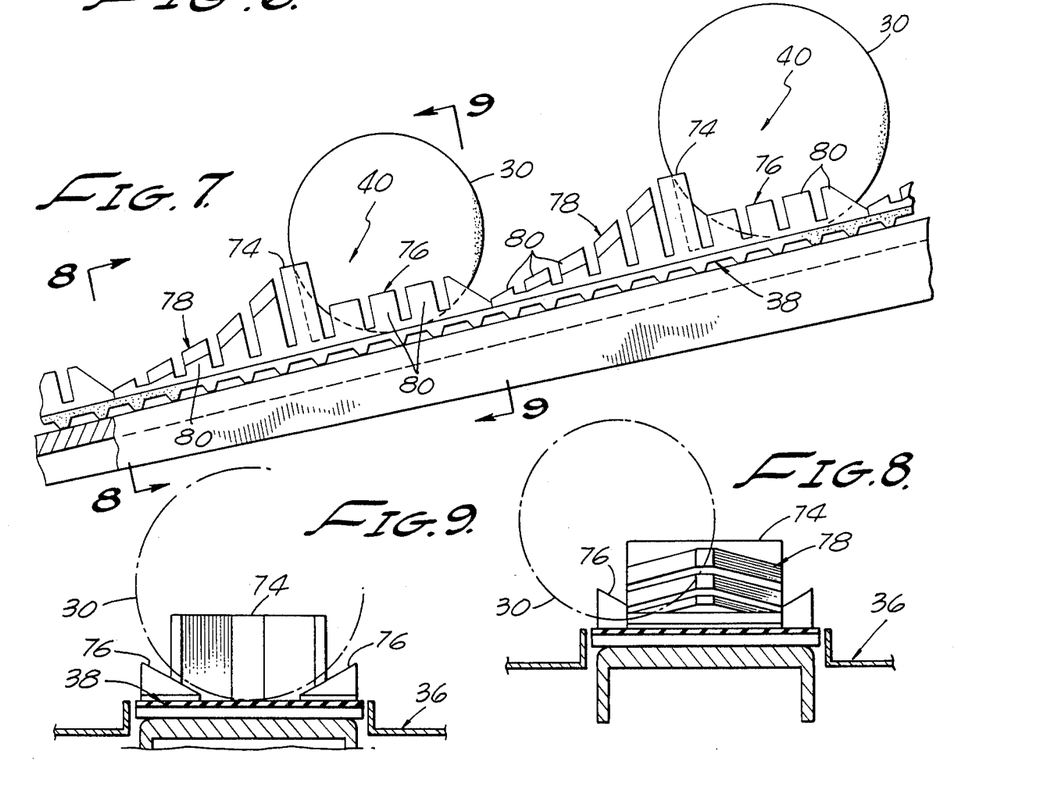
FIG. 7 is a side view of the endless singulation conveyor taken along the line 7—7 in FIG. 6.
FIGS. 8 and 9 are sectional views taken respectively along section lines 8—8 and 9—9 in FIG. 7.
Figure 10:
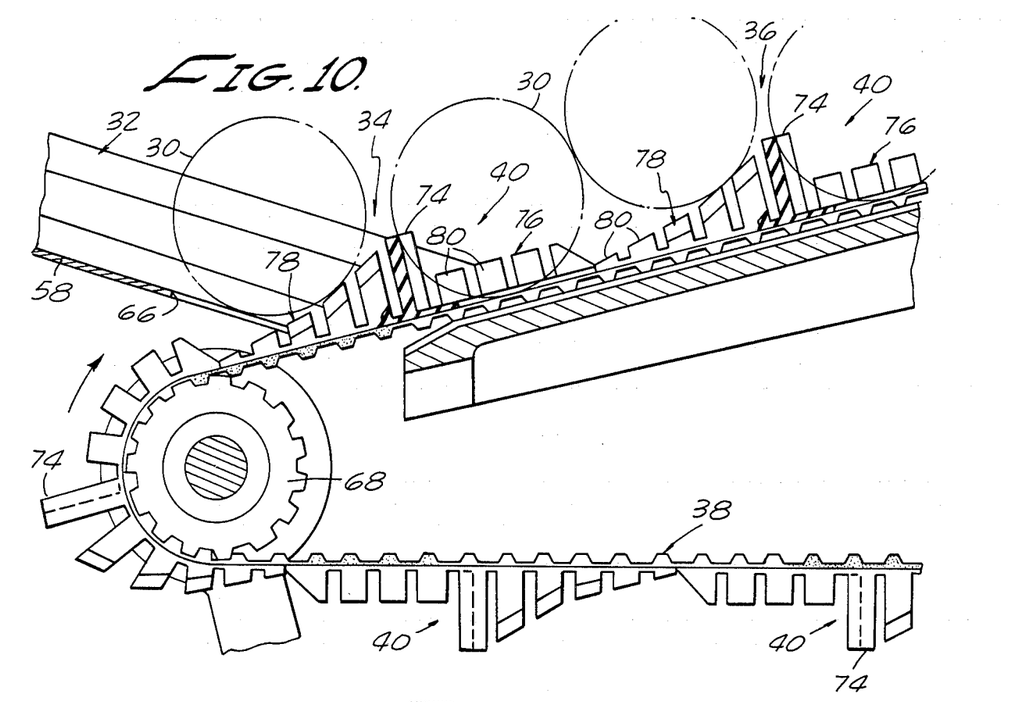
FIG. 10 is an enlarged fragmentary view taken at the left end of the singulation conveyor, as seen, for example, in FIGS. 2A and 5, to better illustrate the manner in which fruit is supplied to the singulation conveyor at a pick-up point.

Referring again to the left end of the high-speed processing apparatus 20 as viewed, for example, in FIGS. 1A and 2A, the alignment or queuing assembly 32 is also illustrated in FIGS. 3 and 4. Referring to those FIGS. in combination, the alignment assembly 32 includes a first ramp 58 which is in communication with the source 22 for receiving a continuous supply of fruit, the ramp 58 extending downwardly toward the pick-up point 34 so that the fruit is accumulated and aligned to form a continuous supply at the pick-up point. In order to further assure a continuous supply of fruit at the pick-up point 34, in view of the high-speed mode of operation contemplated for the apparatus 20, an additional ramp 60 is also connected with the source 22, the additional ramp 60 inclining downwardly toward an interconnection point 62 with the first ramp 58 upstream from the pickup point 34. The additional ramp 60 is preferably formed with an angled branch 64 which forms the interconnection 62 with the first ramp 58.

The angle of inclination for the additional ramp 60 and the branch 64 is lesser than the angle of inclination for the first ramp 58. This lesser angle assures that pressure of fruit in this additional ramp will not press heavily on fruit in the first ramp, shutting off or bridging flow out of the lower end of the first ramp. Thus, with a source of aligned fruit in each of the ramps 58 and 60, the fruit in the branch 64 tends to fill in any vacancies in the alignment of fruit in the first ramp 58 adjacent the pick-up point 34.

The singulation conveyor 36 is arranged to travel in an upwardly inclined direction as it passes the pick-up point 34. Also, note in FIG. 4 that the lower end of the first ramp 58 adjacent the pick-up point 34 is notched as indicated at 66 in order to allow the endless conveyor belt 38 of the singulation conveyor 36 to pass in close proximity to the end of the first ramp 58 at the pick-up point.

Having particular reference to FIG. 5, the endless conveyor belt 38 is trained about a small pulley 68 adjacent the pick-up point 34, another small pulley 70 at the transfer point 44 at the other end of the singulation conveyor and a large, centrally arranged idler pulley 72.

The endless conveyor belt 38 in the singulation conveyor is best illustrated in FIGS. 5-10. Referring to those FIGS., it is noted again that each of the pockets 40 includes means to assure that one fruit from the pick-up point 34 is captured in the pocket while rejecting additional units of fruit tending to enter the same pocket. For this purpose, each of the pockets is formed with an upstanding wall 74 which is arranged transversely to the belt for engaging the lowermost fruit in the first ramp 58 at the pick-up point 34. In order to assure capture of the fruit in the pocket, a portion of the pocket extending forwardly of the upstanding wall 74 defines surface means 76 which incline inwardly and downwardly toward the longitudinal center of the belt 38. The inwardly inclined surface means 76 may be best seen in FIG. 9. The length of the inwardly inclined surface means 76 is selected to assure the capture of a single unit of fruit, keeping in mind the random sizes which may be encountered at the pick-up point 34. Additional surface means 78 (see FIG. 8) arranged forwardly of the inwardly inclined surface means 76 incline outwardly and downwardly from the longitudinal center of the belt 38. With a first unit of fruit 30 being captured within a respective pocket as illustrated, for example, in FIG. 7, the outwardly inclined surface means 78 (see FIG. 8) causes any additional units of fruit attempting to enter the same pocket to be discharged laterally off of the endless conveyor belt 38 as illustrated in phantom in both FIGS. 6 and 8. For this purpose, the outwardly inclined surface means 78 extends forwardly from the inwardly inclined surface means 76 to the upstanding wall 74 of the preceding pocket. At the same time, the outwardly inclined surface means 78 tapers upwardly into alignment with the upstanding wall 74.

In order to maintain flexibility of the endless conveyor belt 38, the upstanding wall 74, the inwardly inclined surface means 76 and outwardly inclined surface means 78 of each pocket are formed by segmented sections 80 which permit the pockets to accomplish the functions described above while also permitting the belt 38 to be sufficiently flexible for the pick-up point 34 and transfer point 44 respectively.

Referring in particular to FIG. 5, the endless conveyor belt 38 passes over the idler pulley 72 and approaches the small pulley 70 adjacent the transfer point 44 while travelling along a generally horizontal path before making the sharp turn about the small pulley 70. At the same time, the processing conveyor 48 is arranged closely adjacent the pulley 70 in order to facilitate the transfer of fruit from the individual pockets 40 of the singulation conveyor belt 38 into the trays 46 of the processing conveyor. Having particular reference to FIG. 11, it may be seen that as each of the pockets 40 on the belt 38 passes about the pulley 70, the respective unit of fruit is propelled forwardly in a trajectory 82. As noted above, the trajectory 82 is limited to a relatively short distance because of the close arrangement of the processing conveyor 48 to the pulley 70. As was also noted above, operation of the processing conveyor 48 is synchronized with operation of the singulation conveyor 36 so that as each unit of fruit is projected from one of the pockets 40 along the trajectory 82, one of the trays 46 is positioned by the processing conveyor at the end of the trajectory 82 for receiving the individual unit of fruit. Thus, the combined operation of the singulation conveyor 36 and processing conveyor 48 serves to assure accurate placement of single units of fruit in each of the trays with minimum possible damage to the fruit.

Figure 11:
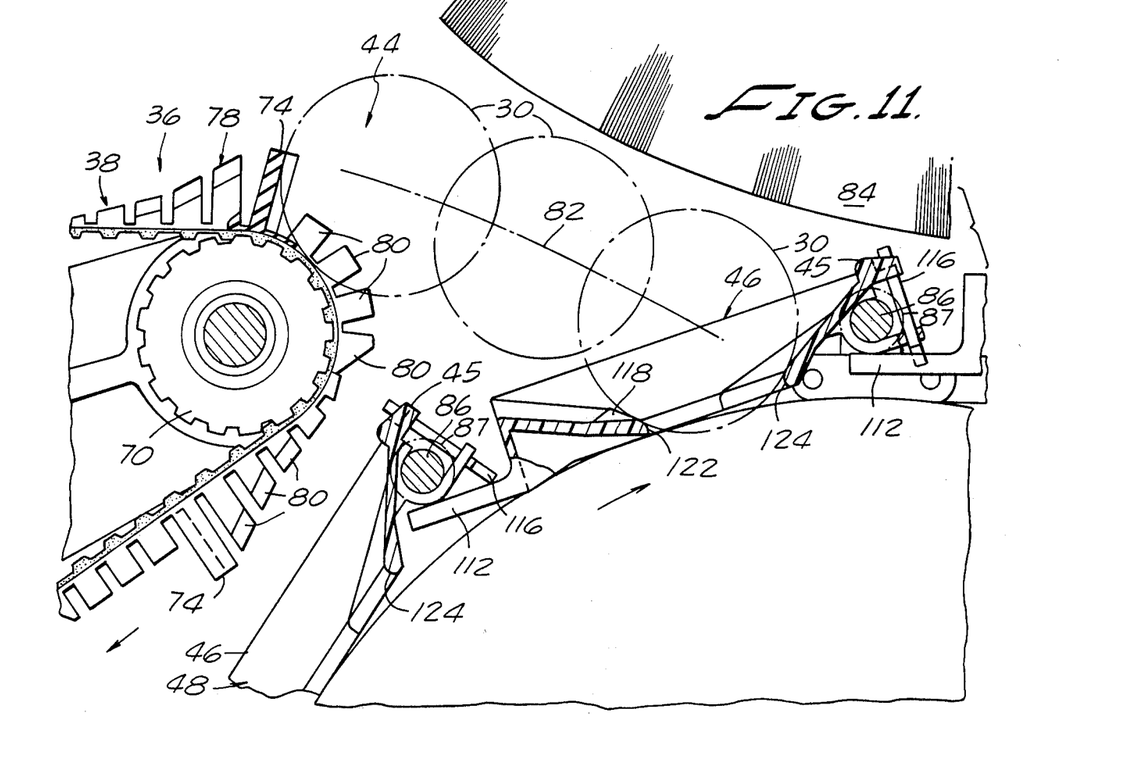
FIG. 11 is similarly a detailed view at the right end of the singulation conveyor, as also viewed, for example, in FIGS. 2A and 5, to better illustrate a transfer point at which fruit is transferred from the singulation conveyor to a processing conveyor.

To further enhance transfer of the fruit from the singulation conveyor 36 to the processing conveyor 48, a rotating brush 84 is mounted for rotation closely adjacent the transfer point 44. The purpose of the rotating brush 84 is to provide yielding means for engaging the fruit as it passes through the trajectory 82 and as it is received by a respective one of the trays 46 in order to prevent the fruit from bouncing upon contact with the trays.

Figure 12:
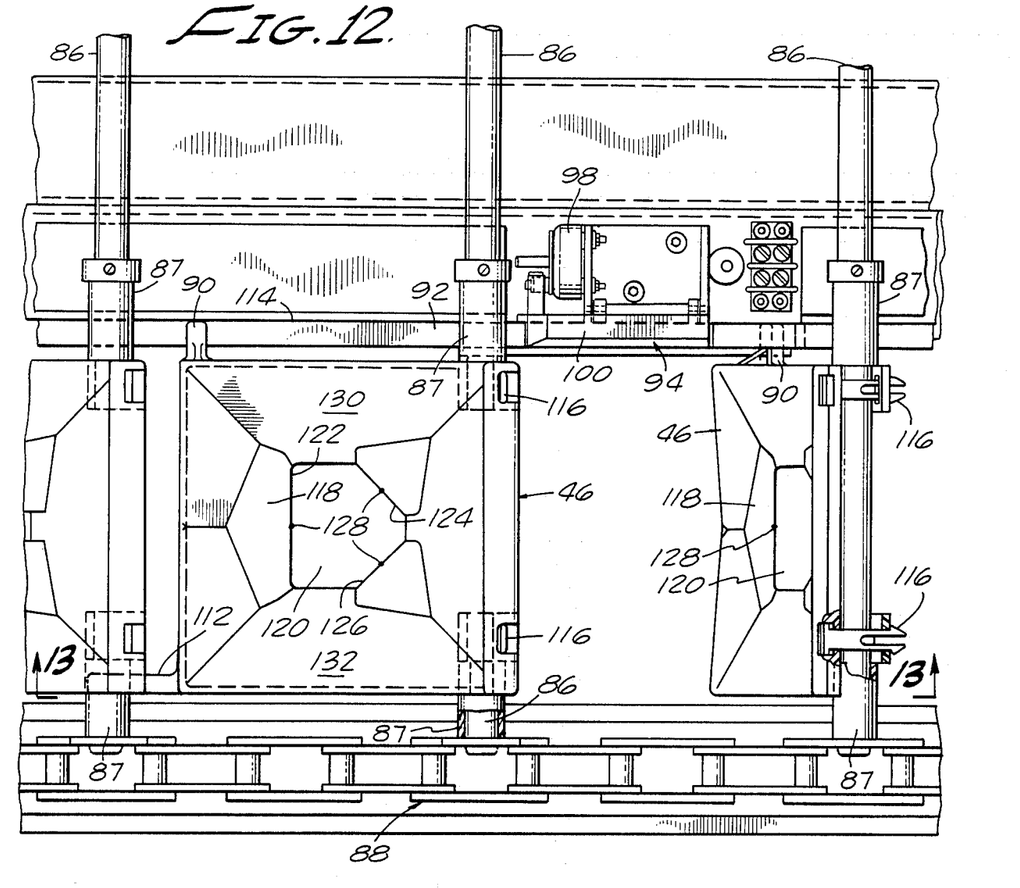
FIG. 12 is an enlarged fragmentary view taken along section line 12—12 in FIG. 2B to better illustrate details for each of an endless array of trays in the processing conveyor.
Figure 13:
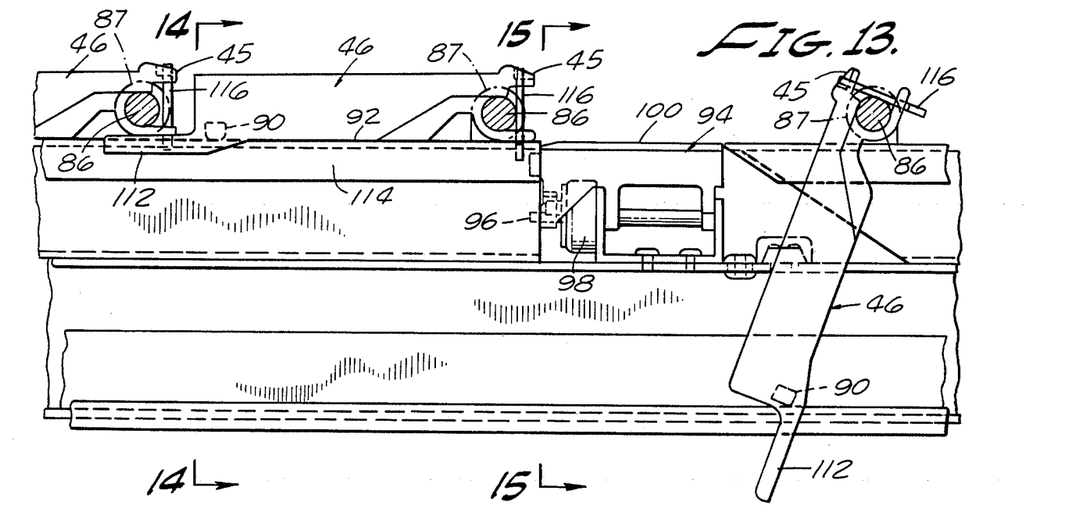
FIG. 13 is a fragmentary view taken along the section line 13—13 in FIG. 12.

The construction of the processing conveyor 48 may be best seen by combined reference to FIGS. 12–18. Referring to those FIGURES in combination, the trays 46 are each rotatably supported by a transverse rod 86 which is connected at its opposite ends to links of drive chains 88 of the conveyor. A projection 90 extends laterally from the rear of each tray 46 for engagement with a supporting rail 92 arranged parallel to the upper course of the processing conveyor from the transfer point 44 past the detector station 50 to the discharge stations 54. At the discharge stations 54, a discharge actuator 94 forms a continuation of the supporting rail 92 for each of the discharge passages 56 (see FIG. 2B). Keeping in mind the high-speed rate of operation for the processing apparatus and the processing conveyor 48, each of the discharge actuators 94 is appropriately located so that, upon actuation in a manner hereinafter described, the discharge actuator 94 opens a gap in the supporting rail 92 causing one of the trays 46 to be rotated into an unloading position as illustrated in FIG. 13 so that the fruit carried by the particular tray is discharged into a selected one of the discharge passages 56 as determined by the optical sensor 52.

Figure 14:
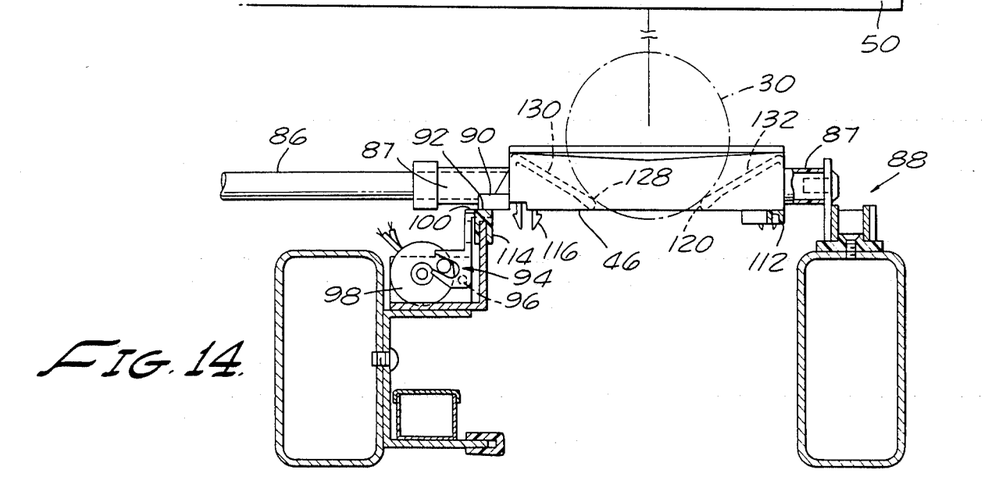
FIGS. 14 and 15 are fragmentary views on a reduced scale, taken respectively along section lines 14—14 and 15—15 in FIG. 13.
Figure 15:
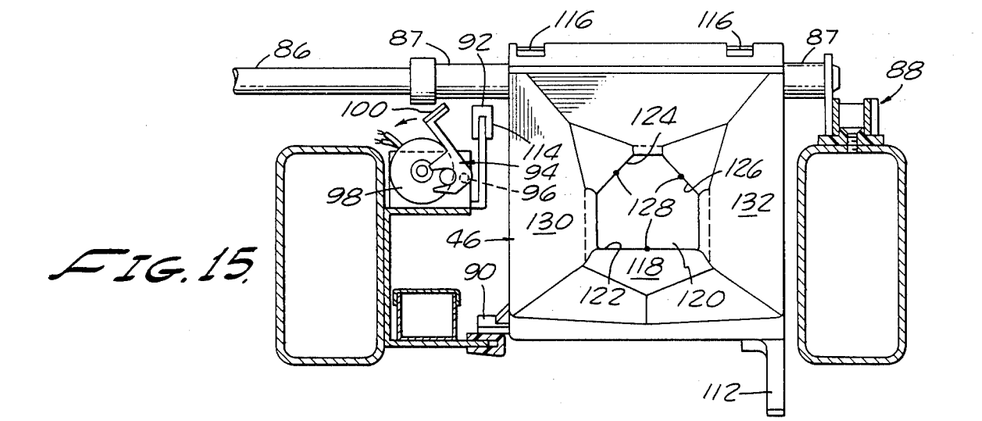
Figure 16:
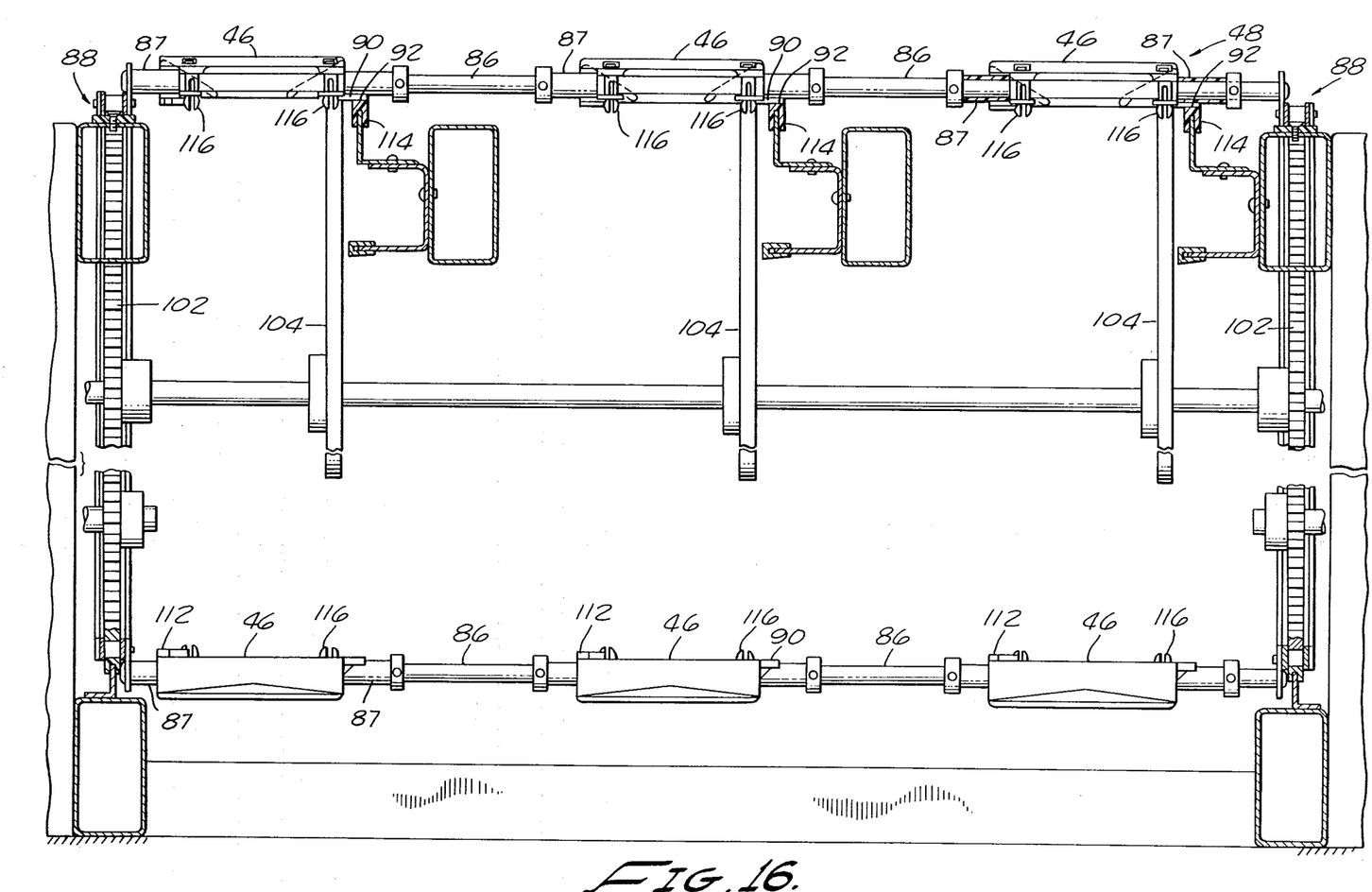
FIG. 16 is a view taken along the section line 16—16 in FIG. 2B.

The manner in which the discharge actuator 94 responds in proper timed sequence to the optical sensor means 52 is controlled by computer means (not shown) which are not a portion of the present invention. Otherwise, the manner of operation for each of the discharge actuators 94 is hereinafter described in greater detail. Referring particularly to FIGS. 14 and 15, each discharge actuator 94 is arranged for pivotal movement about an axis 96 under the influence of a rotary solenoid 98. With the rotary solenoid 98 in the position illustrated in FIG. 14, the respective discharge actuator 94 is maintained in an erect position so that its upper surface 100 forms a continuation of the support rail 92. However, when the rotary solenoid 98 is operated in appropriate response to the optical sensor means 52 in the detector station, it is rotated outwardly to the position illustrated in FIG. 15 which causes the upper surface 100 of the discharge actuator 94 to move out of alignment with the support rail 92. This produces a gap in the support rail illustrated in FIG. 13 permitting a selected tray to be rotated into an unloading position adjacent a selected discharge passage 56 as described above.

It is, of course, important that the rotary solenoid 98 rapidly return the discharge actuator 94 to its erect position illustrated in FIG. 14 before the lateral projection of a successive tray passes thereover. If the optical sensor means 52 determines that the fruit in a successive tray or trays should be discharged into the same passage 56, the same discharge actuator 94 would remain open or again be operated for causing the successive trays to unload their fruit into the same discharge passage 56. In any event, any of an array of similar discharge actuators 94 are controlled by similar rotary solenoids 98 in order to form a gap for permitting any of the trays to be rotated into an unloading position for an appropriate one of the discharge passages 56.

Figure 17:
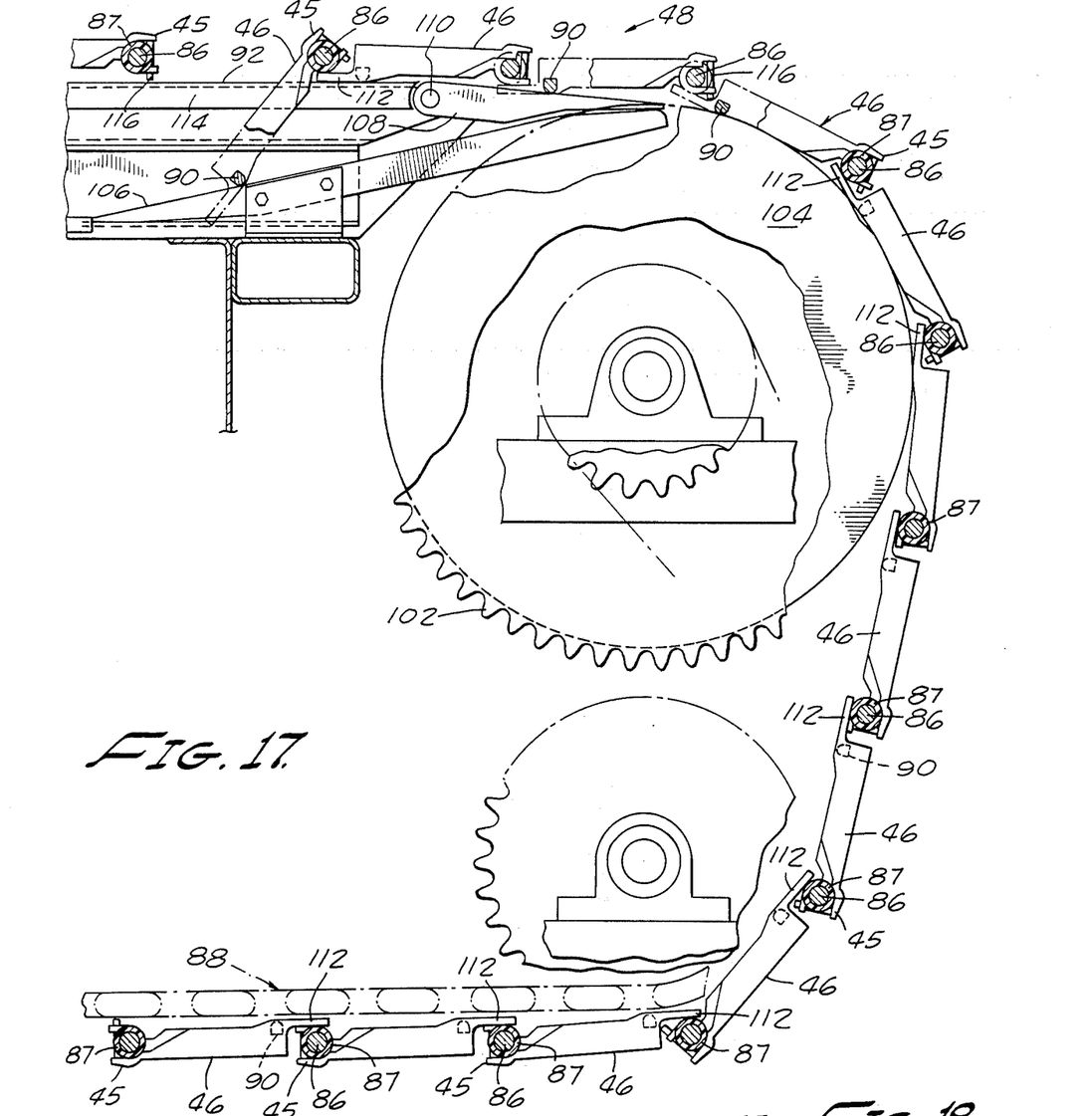
FIG. 17 is an enlarged fragmentary view taken along the section line 17—17 in FIG. 1B.
Figure 18:
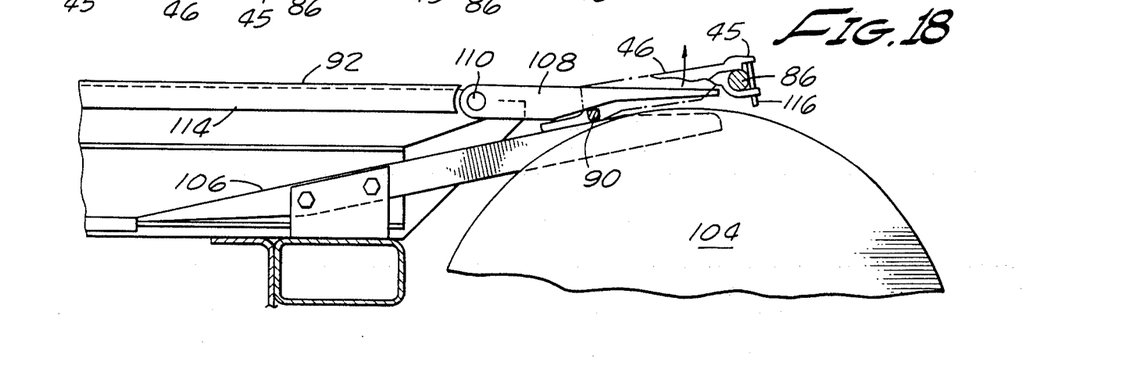
FIG. 18 is an enlarged fragmentary view similar to an upper portion of FIG. 17 in order to illustrate the manner in which individual trays rotated into an unloading position are again brought into an erect position to continue the operating cycle of the conveyor.

Referring to FIGS. 17 and 18, it will be noted that when the trays 46 pass beyond the discharge station 54, they are trained about a gear 102 meshing with the drive chains 88. The gear 102 is provided with an associated retaining disc 104 for engaging the lateral projections 90 on the individual trays to maintain them in an erect position after leaving the supporting rail 92. A cam member 106 is arranged to the left of the retaining disc 104 and tangential with an upper portion thereof for returning unloaded trays to an erect position. It may be seen in FIG. 17 that, as an unloaded tray approaches the cam member 106, its lateral projection 90 rides upwardly on the cam member 106 to be transferred tangentially onto the retaining disc 104.

Referring to FIG. 18, a pivoting ramp 108 forms an extension of the supporting rail 92 and also terminates at its rightward end, as viewed in FIG. 17, in tangential relation with an upper portion of the retaining disc 104. Accordingly, for any of the trays 46 which pass through the discharge station without being unloaded, their lateral projection 90 will be supported by the pivoting ramp 108 as they pass from the support rail 92 for engagement with the retaining disc 104. However, for any trays which are pivoted into an unloading position, as noted above, their lateral projections 90 will ride up a cam member and pass beneath the pivoting ramp 108 causing it to rotate about its pivot axis 110 so that the lateral projections for all of the trays are placed in engagement with the cam member 106 as they pass over the gear 102.

As the trays 46 then pass downwardly for return along the lower course of the processing conveyor a rearward projection 112 on the trays rides on one of a pair of spacer sleeves 87 mounted on the rods 86 thereby preventing the trays from falling during their travel back to the transfer point 44. The spacer sleeves 87 are effective to maintain the trays in alignment.

As may be best seen in FIG. 14, the upper surface of the supporting rail 92 is provided with an elastomeric cap 114 to eliminate clatter and noise generation during operation of the processing conveyor 48. As shown, other portions of the processing apparatus 20 may also be provided with elastomeric surfacing as necessary to similarly avoid undesirable noise generation.

Referring particularly to FIGS. 12 and 13, the trays 46 are provided at their forward ends with laterally spaced U-shaped projections 45 which straddle the rods 86 to permit swinging movement of the trays, and removable spring clips 116 pass through aligned openings in the legs of the U-shaped portions thereby permitting rapid interchange or replacement of the trays.

Referring particularly to FIGS. 12, 14 and 15, each of the trays 46 is formed with a floor 118 having a central opening 120 formed by three surfaces 122, 124 and 126 arranged in triangulated relation to provide a three-point support for each unit of fruit regardless of size. Referring particularly to FIG. 12, the three points of support for the fruit, regardless of size, are indicated at 128. At the same time, wall portions 130 and 132 are inclined inwardly and downwardly toward the central opening 120 in order to assist in directing a unit of fruit into engagement with the three-point support 128.

Figure 19:
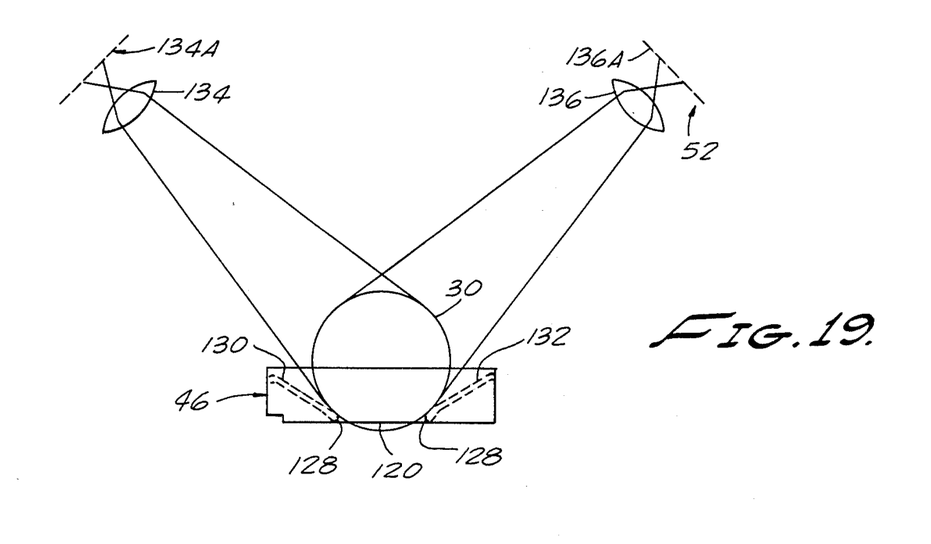
FIG. 19 is a schematic view to better illustrate the manner in which the individual trays in the processing conveyor are designed to enhance exposure of individual units of fruit carried in the trays to an optical sensor.

The inclination of the walls 130 and 132 serves to place them out of engagement with the unit of fruit when it is mounted upon the three points of support 128. This is of particular importance in connection with the optical sensor means 52 as may be best seen in FIG. 19. As illustrated in FIG. 19, the optical sensor means 52 includes viewing lenses for receiving reflections from the surface of the fruit and focusing them on diode arrays, the viewing lenses being indicated at 134 and 136 and arranged in angularly spaced apart relation from each other. Associated diode arrays are indicated at 134A and 136A.

The mounting of the units of fruit on the three-point support 128 out of engagement with the walls 130 and 132, as illustrated in FIG. 19, further enhances exposure of the surfaces of the unit of fruit to the viewing lenses 134 and 136. Similarly, this feature of the trays 46 would also enhance exposure of the units of fruit or the like to other arrangements of optical sensors.

Referring again particularly to FIG. 2B, motor means 138 for operating the processing conveyor and singulation conveyor 36 in synchronized relation to each other is shown in driving engagement with the gear 102 adjacent the discharge end of the processing conveyor. Another gear 140 for the processing conveyor adjacent the transfer point 44 is interconnected with a transfer pulley 142 by means of a timing belt 144 or the like to assure synchronized operation of the processing conveyor 48 and singulation conveyor 36. For that purpose, the transfer pulley 142 is also connected in driving engagement with the pulley 68 of the singulation conveyor by yet another timing belt 146 or the like. As may be best seen in FIGS. 1A and 1B, support shafts for the gear 102, gear 140 and transfer pulley 142 also support similar gears or pulleys for the other parallel processing paths 26 and 28. Thus, the singulation conveyors and processing conveyors for each of the parallel processing paths are operated in synchronized relation by the same drive unit 138.

The method of operation for the present invention is believed clearly apparent from the preceding description. However, it is briefly described again herebelow in order to assure an accurate understanding of the invention.

Initially, fruit from the source 22 is accumulated and aligned to form a continuous supply in each first ramp 58 adjacent the pick-up point 34. The singulation conveyor is then operated to move its individual pockets 40 past the pick-up point so that a single unit of fruit is engaged with each of the pockets in a manner described above. Additional units of fruit are rejected from each pocket in order to assure an arrangement of fruit with predetermined linear spacing on the singulation conveyor. The singulation conveyor also serves to accelerate the fruit to a predetermined processing speed.

As the fruit carried by the singulation conveyor 36 approaches the transfer point 44 it is projected from its respective pockets along a trajectory 82 to be received in one of the trays 46 in the processing conveyor 48. The rotating brush 84 serves to further assure that the fruit is properly positioned on the tray with minimum damage from bouncing or the like. In this manner, the singulation conveyor functions in cooperation with the processing conveyor to assure a high degree of accuracy that only one unit of random sized fruit or the like is positioned in each of the trays 46 in order to further enhance operating efficiency of the entire system.

In the processing conveyor 48, the fruit is then carried by the individual trays 46 past the detector stations 50 where the optical sensor means 52 determines individual characteristics of each unit of fruit. As the fruit then passes further on toward the discharge station 54, the optical sensor means 52 causes a discharge actuator 94 associated with a selected one of a plurality of discharge passages 56 to be operated so that each individual tray is shifted into an unloading position adjacent one of the discharge passages 56 according to the individual characteristics of the respective fruit as determined by the sensor means 52. As may be best seen in FIGS. 2A and 2B, fruit entering the respective discharge passages 56 are carried to further processing by lateral conveyors 148.

As the trays move past the discharge station, they are restored into uniform alignment by a cam member 106 and pivoting ramp 108 so that all of the trays 46 pass about the retaining disc 104 in proper alignment with each other for again accepting fruit at the transfer point 44.

Accordingly, there has been disclosed a novel method and apparatus for the high speed processing and sorting of fruit or the like. Various modifications and additions are believed obvious in both the method and apparatus as disclosed above. Accordingly, the scope of the invention is defined only by the following appended claims.

What is claimed is:

1. Apparatus for high-speed processing of fruit or the like, comprising
   - alignment means for accumulating and aligning a continuous supply of fruit at a pick-up point,
   - a singulation conveyor including continuous conveyor means for movement past said pick-up point, said continuous conveyor means including spaced-apart pockets for receiving individual units of the fruit at the pick-up point, maintaining the fruit in predetermined linear spacing and accelerating the fruit to a predetermined processing speed,
   - a processing conveyor formed with an endless array of trays for receiving the individual units of fruit from the singulation conveyor, the processing conveyor including means for synchronizing its speed relative to the singulation conveyor for assuring that individual units of fruit from the pockets in the singulation conveyor are transferred to respective trays in said processing conveyor, and
   - discharge means associated with said processing conveyor,
   - wherein the alignment means comprises a first ramp inclined downwardly toward said pick-up point, an additional ramp interconnecting with said first ramp at a point upstream of said pick-up point and means for supplying fruit to both said first ramp and said additional ramp in order to further assure a continuous alignment of fruit in said first ramp adjacent said pick-up point.

2. The apparatus of claim 1 wherein the fruit is supplied to the alignment means in random sizes, each of said spaced-apart pockets in said conveyor means including means for accepting a first unit of the random-sized fruit and rejecting any successive unit of fruit.

3. The apparatus of claim 2 wherein each of said trays in said processing conveyor includes receiving means for accurately positioning each unit of the random-sized fruit.

4. The apparatus of claim 1 wherein said additional ramp has a lesser degree of inclination than said first ramp.

5. The apparatus of claim 1 wherein said continuous conveyor means in said singulation conveyor is arranged for travel along an upwardly inclined path adjacent said pick-up point to facilitate deposition of individual units of fruit into each of said spaced-apart pockets in said singulation conveyor and to facilitate rejection of additional undesired fruit.

6. Apparatus for high-speed processing of fruit or the like, comprising
   - alignment means for accumulating and aligning a continuous supply of fruit at a pick-up point,
   - a singulation conveyor including continuous conveyor means for movement past said pick-up point, said continuous conveyor means including spaced-apart pockets for receiving individual units of the fruit at the pick-up point, maintaining the fruit in predetermined linear spacing and accelerating the fruit to a predetermined processing speed,
   - a processing conveyor formed with an endless array of trays for receiving the individual units of fruit from the singulation conveyor, the processing conveyor including means for synchronizing its speed relative to the singulation conveyor for assuring that individual units of fruit from the pockets in the singulation conveyor are transferred to respective trays in said processing conveyor,
   - discharge means associated with said processing conveyor,
   - said continuous conveyor means in said singulation conveyor being arranged for travel along an upwardly inclined path adjacent said pick-up point to facilitate deposition of individual units of fruit into each of said spaced-apart pockets in said singulation conveyor and to facilitate rejection of additional undesired fruit, and
   - each of said spaced-apart pockets in said continuous conveyor means being formed with an upstanding end wall for engaging an individual unit of fruit at said pick-up point, each of said pockets having inwardly inclined surface means forward of said end wall for capturing a first unit of fruit engaged by said end wall and outwardly inclined surface means forward of said inwardly inclined surface means and adjacent the upstanding end wall of a preceding pocket for causing additional units of fruit to be rejected from said continuous conveyor means.

7. The apparatus of claim 6 wherein said continuous conveyor means is a flexible belt, said upstanding end wall means, said inwardly inclined surface means and said outwardly inclined surface means being formed by sectioned segments on said belt for increasing its flexibility.

8. The apparatus of claim 6 wherein a transfer end of said singulation conveyor adjacent said processing conveyor is trained about a pulley means so that individual units of fruit are projected from said respective pockets along a selected trajectory, the synchronized speed of the processing conveyor causing its respective trays to be positioned at the end of the trajectory for receiving the individual units of fruit.

9. The apparatus of claim 8 wherein said pulley means at the transfer end of said singulation conveyor is of relatively small radius so that each unit of fruit travels only a short distance along said trajectory before being received in a respective tray.

10. The apparatus of claim 9 further comprising means for yieldingly engaging the fruit units as they travel along the trajectory from said singulation conveyor and as it is received by one of said respective trays for preventing the fruit from bouncing upon engagement with said trays and for urging the fruit into a centered position in said respective trays.

11. The apparatus of claim 10 wherein said yielding means comprises a revolving brush arranged adjacent the transfer end of said singulation conveyor.

12. The apparatus of claim 6 wherein said discharge means includes means responsive to sensor means for sensing individual characteristics of units of fruit carried by said respective trays, said discharge means including means thereupon causing the trays to discharge the individual units of fruit into one of a plurality of discharge passage means according to the individual characteristics of the fruit units.

13. The apparatus of claim 12 wherein each tray is supported for rotation about an axis transverse to a path of travel for said endless array of trays and includes a laterally extending projection supported on track means for maintaining the tray in a horizontal fruit-supporting position, said discharge means being responsive to said sensor means for interrupting said track means adjacent a selected one of said plurality of discharge passage means and causing a respective tray to be pivoted into an unloading position for causing its unit of fruit to enter said selected discharge passage means.

14. The apparatus of claim 12 wherein said sensor means is adapted for sensing size characteristics of the individual units of fruit.

15. Apparatus for high-speed processing of fruit or the like, comprising
  alignment means for accumulating and aligning a continuous supply of fruit at a pick-up point,
  a singulation conveyor including continuous conveyor means for movement past said pick-up point, said continuous conveyor means including spaced-apart pockets for receiving individual units of the fruit at the pick-up point, maintaining the fruit in predetermined linear spacing and accelerating the fruit to a predetermined processing speed,
  a processing conveyor formed with an endless array of trays for receiving the individual units of fruit from the singulation conveyor, the processing conveyor including means for synchronizing its speed relative to the singulation conveyor for assuring that individual units of fruit from the pockets in the singulation conveyor are transferred to respective trays in said processing conveyor, and
  discharge means associated with said processing conveyor,
  wherein each of said trays has a floor forming a central opening with three triangulated surfaces providing three-point support for respective units of random sized fruit in order to uniformly fix the position of each unit of random sized fruit in said respective tray and thereby facilitate processing of the fruit.

16. The apparatus of claim 15 wherein each tray in said processing conveyor is formed with inwardly and downwardly inclined walls for urging the individual units of fruit onto said three-point support.

17. Apparatus for high-speed processing of fruit or the like, comprising
  alignment means for accumulating and aligning a continuous supply of fruit at a pick-up point,
  a singulation conveyor including continuous conveyor means for movement past said pick-up point, said continuous conveyor means including spaced-apart pockets for receiving individual units of the fruit at the pick-up point, maintaining the fruit in predetermined linear spacing and accelerating the fruit to a predetermined processing speed,
  a processing conveyor formed with an endless array of trays for receiving the individual units of fruit from the singulation conveyor, the processing conveyor including means for synchronizing its speed relative to the singulation conveyor for assuring that individual units of fruit from the pockets in the singulation conveyor are transferred to respective trays in said processing conveyor, and
  discharge means associated with said processing conveyor,
  wherein said discharge means includes means responsive to sensor means for optically sensing individual characteristics of units of fruit carried by said respective trays, each of said trays including a floor forming a central opening with three triangulated surfaces forming a three-point support for respective units of random sized fruit in order to uniformly fix the position of the random sized fruit units in said respective trays and assuring exposure of the fruit units to said optical sensor means for facilitating processing of the fruit.

18. The apparatus of claim 17 wherein each tray is also formed with inwardly and downwardly inclined walls for urging the fruit units onto said three-point support with exposure of the fruit units to said optical sensor means being unimpeded by the walls of said trays.

19. The apparatus of claim 17 further comprising a parallel arrangement of multiple processing conveyors having similar characteristics, separate alignment means and continuous singulation conveyor means being provided for each of said multiple processing conveyors.

20. Alignment apparatus for accumulating and aligning a continuous supply of fruit or the like at a pick-up point in order to permit high-speed processing thereof, comprising
  a source of fruit in bulk,
  a first ramp arranged for receiving fruit from said source, said first ramp being inclined downwardly towards said pick-up point, and
  an additional ramp also arranged for receiving fruit from said source, said additional ramp inclining downwardly toward and interconnecting with said first ramp at a point upstream of said pick-up point whereby fruit from said additional ramp tends to be supplied as required for further assuring a continuous alignment of fruit in said first ramp adjacent said pick-up point.

21. The alignment apparatus of claim 20 wherein said additional ramp has a lesser degree of inclination than said first ramp.

22. A singulation conveyor for receiving individual units of fruit or the like at a pick-up point, maintaining the fruit in predetermined linear spacing and accelerating the fruit to a predetermined speed for further processing, comprising a continuous conveyor means formed with an endless array of spaced-apart pockets for receiving the individual units of fruits, each of said spaced-apart pockets in said continuous conveyor means being formed with an upstanding end wall for engaging an individual unit of fruit at said pick-up point, each of said pockets having inwardly inclined surface means forward of said end wall for capturing a first unit of fruit engaged by said end wall and outwardly inclined surface means forward of said inwardly inclined surface means and adjacent the upstanding end wall of a preceding pocket for causing additional units of fruit to be rejected from said continuous conveyor means.

23. The continuous conveyor means of claim 22 wherein said continuous conveyor means is a flexible belt, said upstanding end wall means, said inwardly inclined surface means and said outwardly inclined surface means being formed by sectioned segments along the length of said belt for increasing its flexibility.

24. The continuous conveyor means of claim 22 wherein fruit is supplied to the continuous conveyor means in random sizes, the length of said inwardly inclined surface means for each pocket being selected for retaining relatively large units of fruit while preventing retention of more than one relatively small unit of fruit.

25. The continuous conveyor means of claim 22 further comprising pulley means upon which said continuous conveyor means is trained, said pulley means being arranged for causing said continuous conveyor means to travel along an upwardly inclined path adjacent said pick-up point for facilitating deposition of individual units of fruit into each of said spaced-apart pockets.

26. The continuous conveyor means of claim 25 wherein said pulley means are arranged at a transfer end of said continuous conveyor means opposite said pick-up point so that individual units of fruit are projected from said respective pockets along a selected trajectory in order to facilitate reception of the individual units of fruit in respective means for facilitating further processing.

27. The continuous conveyor means of claim 26 further comprising means for yieldingly engaging the fruit units as they travel along the trajectory and as they are received by said respective means for preventing the fruit from bouncing upon engagement with said respective means.

28. A processing conveyor adapted for high-speed processing of fruit or the like, the processing conveyor comprising an endless array of trays for receiving individual units of fruit at an initial transfer point, each tray being supported for rotation about an axis transverse to a path of travel for said endless array of trays and including a laterally extending projection,
 a discharge station,
 track means arranged parallel to the path of travel for said endless array of trays adjacent said discharge station for supporting the laterally extending projections and thereby maintaining the trays in a horizontal fruit supporting position, and
 sensor means for sensing individual characteristics of the units of fruit carried by said respective trays, said discharge station including discharge means responsive to said sensor means for interrupting said track means adjacent one of a plurality of discharge passage means for causing a respective tray to be pivoted into an unloading position so that its unit of fruit enters a selected one of said plurality of discharge passage means according to the individual characteristics of the fruit unit, said interruption in said track means being restored immediately after unloading of the respective tray to permit processing of the fruit unit in a successive tray according to its individual characteristic,
 further comprising pulley means about which said endless array of trays is trained and means for restoring trays pivoted into an unloading position and adapting them for receiving an additional unit of fruit as they pass the transfer point,
 said sensor means being adapted for optically sensing individual characteristics of units of fruit carried by said respective trays, each of said trays including a floor forming a central opening with three triangulated surfaces forming three-point support for the fruit in order to uniformly position the fruit in said trays and properly expose the fruit to said optical sensor means.

29. The processing conveyor of claim 28 wherein each tray is also formed with inwardly and downwardly inclined walls for urging the fruit onto said three-point support with exposure of the fruit to said optical sensor being unimpeded by the walls of said trays.

30. A processing conveyor for receiving individual units of fruit or the like at a transfer point and conveying the fruit past a sensor station including sensor means for optically scanning the individual units of fruit and determining their individual characteristics, the processing conveyor then conveying the fruit to a discharge station adapted for discharging individual units of fruit into one of a plurality of discharge passage means according to individual characteristics of the fruit units, the processing conveyor comprising an endless array of trays for receiving the individual units of fruit and conveying them past the sensing station and the discharge station, each of said trays including a floor forming a central opening with three triangulated surfaces forming three-point support for respective units of fruit in order to uniformly fix the position of the units of fruit in said respective trays and thereby assure exposure of the fruit units to said optical sensor means for facilitating processing of the fruit, each of said trays further being formed with inwardly and downwardly inclined walls for urging the fruit units onto said three-point support and out of engagement with the walls of the trays to further enhance exposure of the fruit units to said optical sensor means.

31. A replaceable tray for use in a processing conveyor adapted for high-speed processing of fruit or the like, the processing conveyor including endless drive means for connection with an array of the replaceable trays to receive individual units of fruit at an initial transfer point, for causing the trays to convey the fruit past a sensor means and for selectively discharging the fruit at a discharge station, the replaceable tray comprising releasable means for interconnecting the tray with the endless drive means and for permitting pivotable movement of said replaceable tray, and means projecting laterally from said tray for riding in a track adapted for maintaining the tray in an upright fruit containing position, said projecting means further being adapted for release from the track in order to permit said tray to pivot into an unloading position,
 wherein said tray includes a floor forming a central opening with three-point support for the fruit in order to uniformly position fruit in said trays and to better expose the fruit to the sensor means.

32. The replaceable tray of claim 31 wherein said releasable means comprises rod means connected with the endless drive means and replaceable clip means for securing the tray in pivotably movable relation to said rod means.

33. The replaceable tray of claim 31 further comprising a projection extending rearwardly from the tray in order to maintain a sequence of trays in alignment with each other.

* * * * *